United States Patent
Zhou et al.

(10) Patent No.: US 11,802,180 B2
(45) Date of Patent: Oct. 31, 2023

(54) POLYMERIC POLYOXAZOLINES

(71) Applicant: PPG Industries Ohio, Inc., Cleveland, OH (US)

(72) Inventors: Hongying Zhou, Allison Park, PA (US); Dennis Allan Simpson, Sarver, PA (US); Christopher Paul Kurtz, Millvale, PA (US); Tsukasa Mizuhara, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 142 days.

(21) Appl. No.: 17/215,571

(22) Filed: Mar. 29, 2021

(65) Prior Publication Data

US 2021/0277179 A1    Sep. 9, 2021

Related U.S. Application Data

(63) Continuation of application No. 15/843,914, filed on Dec. 15, 2017, now Pat. No. 10,988,573.

(51) Int. Cl.

| | |
|---|---|
| *C08G 63/91* | (2006.01) |
| *C08G 65/331* | (2006.01) |
| *C09D 179/02* | (2006.01) |
| *C08G 65/333* | (2006.01) |
| *C08G 73/02* | (2006.01) |
| *B05D 1/02* | (2006.01) |
| *B65D 1/12* | (2006.01) |
| *B65D 23/02* | (2006.01) |
| *C09D 133/08* | (2006.01) |

(52) U.S. Cl.
CPC ......... *C08G 63/916* (2013.01); *B05D 1/02* (2013.01); *B65D 1/12* (2013.01); *B65D 23/02* (2013.01); *C08G 65/331* (2013.01); *C08G 65/333* (2013.01); *C08G 65/33396* (2013.01); *C08G 73/0233* (2013.01); *C09D 133/08* (2013.01); *C09D 179/02* (2013.01)

(58) Field of Classification Search
None
See application file for complete search history.

(56) References Cited

U.S. PATENT DOCUMENTS

| | | |
|---|---|---|
| 3,563,920 A | 2/1971 | Tomalia et al. |
| 3,663,653 A | 5/1972 | Frolich et al. |
| 3,730,915 A | 5/1973 | Tomalia et al. |
| 3,758,629 A | 9/1973 | Thill |
| 4,543,396 A | 9/1985 | Yoshihiro et al. |
| 4,731,398 A * | 3/1988 | Huber ............. C09K 3/10 525/10 |
| 5,990,226 A * | 11/1999 | Arita ............. C09D 179/02 524/415 |
| 6,465,582 B1 * | 10/2002 | Higginbottom ...... C09D 167/00 528/80 |
| 2017/0211188 A1 * | 7/2017 | Miura ............. C23C 2/26 |
| 2017/0369732 A1 * | 12/2017 | Takayama ........... B05D 7/532 |

FOREIGN PATENT DOCUMENTS

| | | | |
|---|---|---|---|
| CN | 101020746 A | | 8/2007 |
| CN | 105330854 A | | 2/2016 |
| CN | 105348522 A | | 2/2016 |
| EP | 0450724 A1 | | 10/1991 |
| GB | 1347066 | | 2/1974 |
| JP | 11319707 A | * | 11/1999 |
| JP | 2013181080 A | | 9/2013 |
| JP | 11319707 A | * | 7/2018 |
| KR | 102253209 B1 | * | 11/1999 |
| KR | 102253209 B1 | * | 7/2018 ........ B05D 7/24 |

OTHER PUBLICATIONS

Office Action issued in Chinese Appln No. 201880079706.8, dated Oct. 8, 2022.

Search Report received in Chinese Patent Application No. 201880079706.8, received Oct. 8, 2022 (3 pages), and English translation thereof (2 pages).

* cited by examiner

*Primary Examiner* — Lee E Sanderson

(57) ABSTRACT

Polymeric polyoxazolines of the following structure are disclosed:

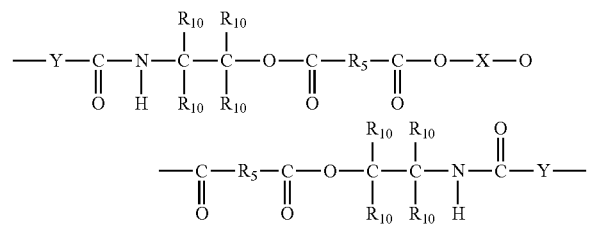

where X is the residue of a polymeric polyol after reaction with a dicarboxylic acid/anhydride; where $R_5$ is an organic moiety; where Y is an organic moiety containing one or more oxazoline groups; and wherein each $R_{10}$ is independently hydrogen or an organic moiety. Methods of making such polyoxazolines and using them in a coating, and packages coated therewith, are also within the scope of the present invention.

17 Claims, No Drawings

POLYMERIC POLYOXAZOLINES

FIELD OF THE INVENTION

This invention is directed to polymeric polyoxazolines and to methods for their preparation and use.

BACKGROUND OF THE INVENTION

A wide variety of coatings have been used to coat the surfaces of food and beverage packaging. For example, metal cans are sometimes coated using coil coating or sheet coating operations; that is, a coil or sheet of steel or aluminum is coated with a suitable composition and cured. The coated substrate is then formed into the can body or can end. Alternatively, the coating composition may be applied, for example, by spraying and dipping, to the formed can and then cured. Coatings for food and beverage packaging is often capable of high speed application to the substrate and provides the necessary properties when cured to perform in a demanding end use environment. For example, the coating should be safe for food contact. The use of coatings made without formaldehyde are increasingly desired.

SUMMARY OF THE INVENTION

The present invention is directed to a polymeric polyoxazoline having the following structure:

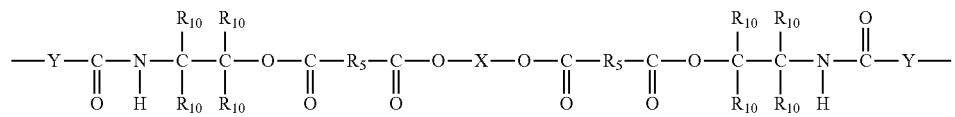

where X is the residue of a polymeric polyol after reaction with a dicarboxylic acid/anhydride; where $R_5$ is an organic moiety; where Y is an organic moiety containing one or more oxazoline groups; and wherein each $R_{10}$ is independently hydrogen or an organic moiety.

The present invention is also directed to a method for making a polymeric polyoxazoline comprising:
(a) reacting a polymeric polyol having terminal and/or pendant hydroxyl groups with a 1,2-dicarboxylic acid/anhydride to form a carboxylic acid functional polymer, and
(b) reacting the carboxylic acid functional polymer with a polyoxazoline.

The present invention is also directed to a coating composition comprising:
(a) a polymer comprising acidic functionality, and
(b) a polymeric polyoxazoline crosslinking agent having the following structure:

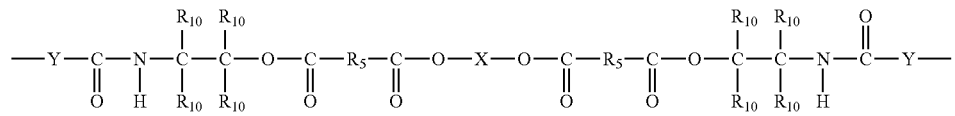

where X is the residue of a polymeric polyol after reaction with a dicarboxylic acid/anhydride; where $R_5$ is an organic moiety; where Y is an organic moiety containing one or more oxazoline groups; and wherein each $R_{10}$ is independently hydrogen or an organic moiety.

The present invention is also directed to a package comprising a coating composition applied to at least a portion of a surface of the package, the coating composition comprising:
(a) a polymer comprising acidic functionality, and
(b) a polymeric polyoxazoline crosslinking agent having the following structure:

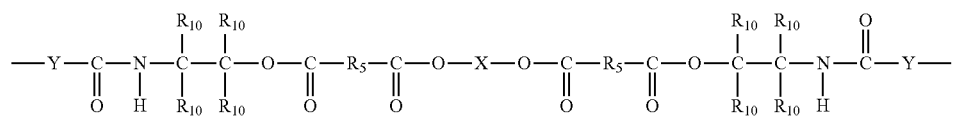

where X is the residue of a polymeric polyol after reaction with a dicarboxylic acid/anhydride; where $R_5$ is an organic moiety; where Y is an organic moiety containing one or more oxazoline groups; and wherein each $R_{10}$ is independently hydrogen or an organic moiety.

DETAILED DESCRIPTION

As used herein, the terms "carboxylic acid" and "carboxyl" may be used interchangeably. "Carboxylic acid functional polymer" means a polymer having at least one unreacted carboxylic acid group that is prepared as described herein by the reaction of a polymeric polyol and dicarboxylic acid/anhydride. A "polymer comprising acidic functionality" also means a polymer having at least one unreacted carboxylic acid group, but it can be prepared by any means known in the art.

As used herein, the term "organic moiety" or "organic group" means a hydrocarbon group (with optional elements other than carbon and hydrogen, such as oxygen, nitrogen, sulfur, and silicon) that is classified as an aliphatic group, cyclic group, including cycloaliphatic and aromatic, or combination of aliphatic and cyclic groups (e.g., alkaryl and aralkyl groups). The term "aliphatic group" means a saturated or unsaturated linear or branched hydrocarbon group. The term "alkyl group" means a saturated linear or branched hydrocarbon group including, for example, methyl, ethyl, isopropyl, t-butyl, heptyl, dodecyl, octadecyl, amyl, 2-ethylhexyl, and the like.

A group that may be the same or different is referred to as being "independently" something.

Substitution may occur on the organic moieties of the compounds according to the present invention. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. For example, the phrase "alkyl group" is intended to include not only pure open chain saturated hydrocarbon alkyl groups consisting of hydrogen and carbon only, such as methyl, ethyl, propyl, t-butyl, and the like, but also alkyl groups bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc.

As used herein, the term "polyoxazoline" means a compound containing at least two (2) oxazoline groups.

The terms "crosslinker", "curing agent" or "crosslinking agent" refer to a molecule capable of forming a covalent linkage between two or more moieties, e.g. two moieties being present in two different polymeric molecules or between two different regions of the same polymer.

The term "dispersed in aqueous medium" means that the polymer comprising acidic functionality and the polymeric polyoxazoline crosslinker can be mixed into aqueous medium to form a stable mixture; that is, the mixture does not separate into immiscible layers within an hour after mixing when left to stand at room temperature (23° C.).

The term "latex" means a polymer that is polymerized by free radical initiated emulsion polymerization techniques in aqueous medium. The polymer is in particulate form and dispersed in aqueous medium.

The term "food-contacting surface" refers to the surface of a package such as an inner surface of a food or beverage package that is in contact with, or intended for contact with, a food or beverage product. By way of example, an interior surface of a metal substrate of a food or beverage package, or a portion thereof such as a can end or a can body, is a food-contacting surface even if the interior metal surface is coated with a coating composition.

The term "colorant" means any substance that imparts color and/or other opacity and/or other visual effect to the composition. As used herein, the term "colorant" means any substance that imparts color and/or other opacity and/or other visual effect, e.g. gloss, to the composition. The colorant can be added to the coating in any suitable form, such as discrete particles, dispersions, solutions and/or flakes. A single colorant or a mixture of two or more colorants can be used in the coatings of the present invention. Particularly suitable for packaging coatings are those approved for food contact, such as titanium dioxide; iron oxides, such as black iron oxide; carbon black; ultramarine blue; phthalocyanines, such as phthalocyanine blue and phthalocyanine green; ferried yellow; quindo red; and combinations thereof, and those listed in Article 178.3297 of the Code of Federal Regulations, which is incorporated by reference herein.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Acrylic and methacrylic monomers and polymers are designated as (meth)acrylic monomers and polymers.

Molecular weights are on a number average basis ("Mn") unless otherwise indicated and are determined by gel permeation chromatography using polystyrene standards.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" polymeric polyoxazoline, "a" film forming resin, "an" isocyanate, "an" alkanol amine, "the" residue of "an", and the like, one or more of each of these and any other components can be used. As used herein, the term "polymer" refers to oligomers and both homopolymers and copolymers, and the prefix "poly" refers to two or more. Including, for example and like terms means including for example but not limited to.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all sub-ranges included within the broader range (e.g., 1 to 5 discloses 1 to 4, 1.5 to 4.5, 4 to 5, etc.).

The present invention is directed to a polymeric polyoxazoline having structure (A):

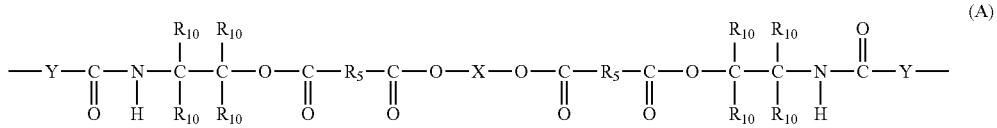
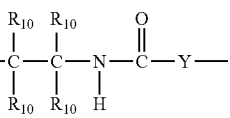

where X is the residue of a polymeric polyol after reaction with a dicarboxylic acid/anhydride; where $R_5$ is an organic moiety; where Y is an organic moiety containing one or more oxazoline groups; and wherein each $R_{10}$ is independently hydrogen or an organic moiety.

The polymeric polyoxazolines of the present invention can be prepared by reacting a polymeric polyol and a dicarboxylic acid/anhydride and then further reacting the resulting product with a polyoxazoline. It will be appreciated that the "—O—X—O" moiety within structure A is the residue of the polymeric polyol, which means the portion of the polyol that remains after reaction with the carboxylic acid/anhydride; the

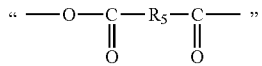

moieties are the residue of the dicarboxylic acid/anhydride, which means the portion of the dicarboxylic acid/anhydride that remains after reaction with the polymeric polyol and the

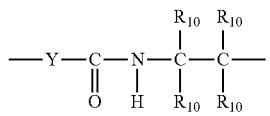

moiety is the residue of the polyoxazoline, which means the portion of the polyoxazoline that remains after reaction with the carboxylic acid functional polymer.

Examples of suitable polymeric polyols are polyether polyols, polyester polyols and polyurethane polyols.

Examples of suitable polyether polyols include polyalkylene ether polyols such as those having the following structural formula:

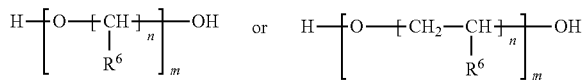

where the substituent $R^6$ is hydrogen or a lower alkyl group containing from 1 to 5 carbon atoms, and n has a value ranging from 2 to 6 and m has a value ranging from 8 to 100 or higher. Exemplary polyalkylene ether polyols include poly(oxytetramethylene) glycols, poly(oxytetraethylene) glycols, poly(oxyethylene) glycols, poly(oxy-1,2-propylene) glycols, and poly(oxy-1,2-butylene) glycols.

Also useful are polyether polyols formed from oxyalkylation of various polyols, for example, glycols such as ethylene glycol, 1,6-hexanediol, and the like. One commonly utilized oxyalkylation method is reaction of a polyol with an alkylene oxide, for example, propylene or ethylene oxide, in the presence of an acidic or basic catalyst. Specific examples of polyethers include those sold under the names TERETHANE and TERECOL, available from BASF.

The hydroxyl functional polyether polymer or oligomer may have an Mn of 250 to 5000, such as 500 to 3200, and a hydroxyl value of 20 to 500.

Linear polyester polyols may also be used and may be prepared by the polyesterification of a polycarboxylic acid or anhydride thereof with excess polyols and/or an epoxide, using any polymerization technique known to those skilled in the art. Usually, the polycarboxylic acids and polyols are aliphatic or aromatic dibasic acids and diols. Transesterification of polycarboxylic acid esters is also possible.

Polyols that can be used in making the polyester include, for example, alkylene glycols, such as ethylene glycol, propylene glycol, neopentyl glycol, and other diols, such as trimethylpentane diol, hydrogenated bisphenol A, cyclohexanediol, cyclohexanedimethanol, caprolactonediol, the reaction product of epsilon-caprolactone and ethylene glycol, hydroxy-alkylated bisphenols, polyether glycols, for example, poly(oxytetramethylene) glycol and the like. Polyols of higher functionality may also be used. Examples include trimethylolpropane, trimethylolethane, pentaerythritol and the like.

The acid component of the polyester can consist of monomeric carboxylic acids or anhydrides thereof having 2 to 18 carbon atoms per molecule exclusive of the carbon atoms of the carboxylic acid or anhydride moieties. Among the acids that are useful are cycloaliphatic acids and anhydrides such as phthalic acid, isophthalic acid, terephthalic acid, tetrahydrophthalic acid, hexahydrophthalic acid, methylhexahydrophthalic acid, 1,3-cyclohexane dicarboxylic acid, and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. Lower alkyl diacids, that is, acids having less than about 10 carbon atoms such as adipic acid, are particularly suitable. The polyester may include minor amounts of monobasic acids such as benzoic acid, stearic acid, acetic acid, and oleic acid. Also, there may be employed higher carboxylic acids such as trimellitic acid and tricarballylic acid. Where acids are referred to in this paragraph, it is understood that anhydrides thereof that exist may be used in place of or in addition to the acid. Also, lower alkyl esters of diacids such as dimethyl glutarate and dimethyl terephthalate may be used. Cycloaliphatic acids and anhydrides are particularly suitable.

The hydroxyl functional polyester polymer may have an Mn of 400 to 3500, such as 800 to 2000, and a hydroxyl value of 20 to 300.

Polyurethanes can also be used. Among the polyurethanes that can be used are polymeric or oligomeric polyols that are prepared by reacting diols, alkylene glycols, or triols with a polyisocyanate such that the OH/NCO equivalent ratio is greater than 1:1 so that free hydroxyl groups are present in the product. The polyols that may be employed in making the polyurethane include those disclosed above in making the polyester.

The organic polyisocyanate that is used to prepare the hydroxyl functional polyurethane can be an aliphatic or an aromatic polyisocyanate or a mixture of the two. Diisocyanates are particularly suitable, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

The hydroxyl functional polyurethane polymer may have a number average molecular weight of 300 to 3000, such as 300 to 600, and a hydroxyl value of 20 to 200.

As noted above, a polymeric polyol is reacted with a dicarboxylic acid/anhydride according to the present invention. Any dicarboxylic acid/anhydride can be used. Dicarboxylic acid/anhydride refers to dicarboxylic acid, dicarboxylic anhydride, and mixtures thereof. The dicarboxylic anhydride can be 1,2-dicarboxylic anhydride. Any suitable dicarboxylic acid/anhydride can be used including any of those listed above for use in preparation of the polyester polyol. Particularly suitable are dicarboxylic acid/anhydrides having 4 to 12 carbons. The value of "$R_5$" will vary depending on the dicarboxylic acid/anhydride used. For example, if the dicarboxylic acid is adipic acid, $R_5$ will be a six carbon alkyl moiety; if the dicarboxylic anhydride is succinic anhydride, $R_5$ will be a two carbon alkyl moiety (ethylene group).

Other suitable acids/anhydrides that can be used in formation of the desired polyesters are those that, exclusive of the carbon atoms of the anhydride moiety, contain from 2 to 30 carbon atoms. Examples include aliphatic, including cycloaliphatic, olefinic and cycloolefinic anhydrides and aromatic anhydrides. Substituted aliphatic and aromatic anhydrides are also included within the definition of aliphatic and aromatic provided the substituents do not adversely affect the reactivity of the anhydride or the properties of the resultant polyester. Examples of substituents are chloro, alkyl and/or alkoxy. Examples of anhydrides include succinic anhydride, methyl succinic anhydride, dodecenyl succinic anhydride, octadecenyl succinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride, maleic anhydride, and norborene anhydride.

The polymeric polyol and a dicarboxylic acid/anhydride are reacted under conditions sufficient to cause a reaction between the hydroxy group of the polyol and the acid group of the dicarboxylic acid/anhydride. For example, when using an anhydride, the conditions should be sufficient to ring open the anhydride forming the half-ester typically with substantially no polyesterification occurring. Such reaction products are of relatively low molecular weight with narrow molecular weight distributions and low viscosity and provide lower volatile organic contents in the coating composition while still providing for excellent properties in the resultant coating. By substantially no polyesterification occurring means that the carboxyl groups formed by the reaction of the anhydride are not further esterified by the polyol in a recurring manner. By this is meant that less than 10, such as less than 5 percent by weight of high molecular weight polyester is formed; high molecular weight in this context means 2500, 3000, or even higher.

To achieve the reaction, the dicarboxylic acid anhydride and polymeric polyol are contacted together usually by mixing the two ingredients together in a reaction vessel. The reaction can be conducted in the presence of an inert atmosphere such as nitrogen and in the presence of a solvent to dissolve the solid ingredients and/or to lower the viscosity of the reaction mixture. Examples of suitable solvents are high boiling materials and include, for example, ketones such as methyl amyl ketone, diisobutyl ketone, methyl isobutyl ketone; aromatic hydrocarbons such as toluene and xylene; as well as other organic solvents such as dimethyl formamide and N-methyl-pyrrolidone.

The reaction temperature can be low, that is, no greater than 160° C., such as less than 120° C., and may be within the range of 70°-135° C., such as 90°-120° C.

The time of reaction can vary somewhat depending principally upon the temperature of reaction. The reaction time can be from as low as 10 minutes to as high as 24 hours.

The equivalent ratio of anhydride groups to hydroxyl of the polymeric polyol can be 0.8:1 to 1.2:1 (the anhydride being considered monofunctional) to obtain maximum conversion to the desired half-ester; the equivalent ratio of acid groups (if a diacid is used) to hydroxyl groups can be 1.6:1 to 2.4:1.

After half-ester formation, the resulting carboxylic acid functional polymer is reacted with a polyoxazoline. The polyoxazoline may contain two, three or four oxazoline groups.

Examples of the polyoxazolines are those having the following structure:

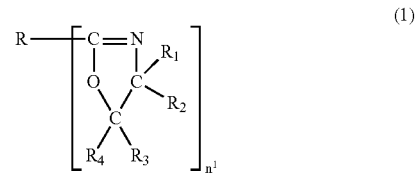

(1)

wherein $n^1$ is an integer of 2 to 4; R is an n-valent organic group such as an arylene or an alkylene radical; $R_1$, $R_2$, $R_3$ and $R_4$ may be the same or different and each independently are selected from hydrogen, and $C_1$ to $C_4$ alkyl such as methyl, ethyl, propyl and butyl. When the polyoxazoline is of structure (1), it will be understood that $R_1$-$R_4$ correspond with $R_{10}$ as shown in structure A. Specific examples of the compound of structure 1 are described below:

1,2-phenylene-bis-oxazoline
1,3-phenylene-bis-oxazoline
1,4-phenylene-bis-oxazoline
1,2-bis(oxazolinyl-4-methyl)benzene
1,3-bis(oxazolinyl-4-methyl)benzene
1,4-bis(oxazolinyl-4-methyl)benzene
1,2-bis(oxazolinyl-5-ethyl)benzene
1,3-bis(oxazolinyl-5-methyl)benzene
1,3-bis(oxazolinyl-5-ethyl)benzene
1,4-bis(oxazolinyl-5-ethyl)benzene
1,2,4-tris(oxazolinyl)benzene
1,3,5-tris(oxazolinyl)benzene
1,2,4,5-tetrakis(oxazolinyl)benzene Examples of other polyoxazolines are those of the structure:

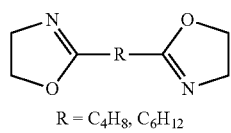

$R = C_4H_8, C_6H_{12}$ (2)

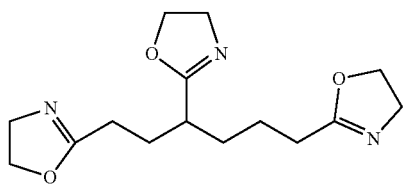

and (3)

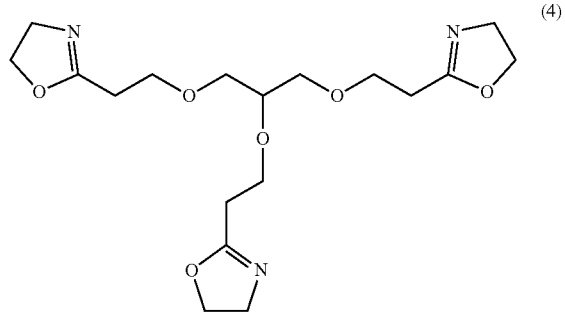

(4)

The reaction of the polyoxazolines with the carboxylic acid functional polymer can typically be accomplished by simply adding the polyoxazoline to the half-ester reaction mixture after the reaction forming the half-ester is complete. The reaction mixture comprising the carboxylic acid functional polymer and the polyoxazoline can be heated to a temperature of 60 to 160° C. and held at this temperature until an acid value of less than 2 is obtained.

As noted above, the moiety

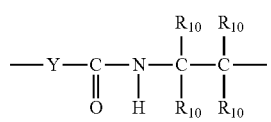

represents the residue of the polyoxazoline; one of the oxazoline rings of the polyoxazoline will react with the carboxylic acid functional polymer and Y is an organic moiety. Because the polyoxazoline has 2-4 oxazoline groups, Y will contain at least one but possibly two oxazoline groups.

The resulting polymeric polyoxazolines may have the structure:

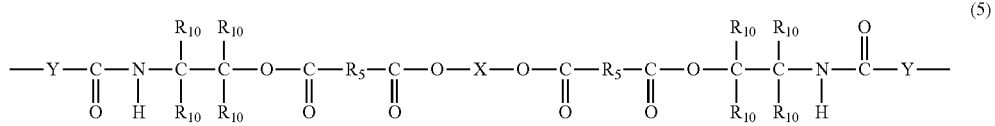

(5)

where X is the residue of a polymeric polyol after reaction with a 1,2-dicarboxylic acid anhydride and where Y is an organic moiety containing one or more oxazoline groups.

Examples of such polymeric polyoxazolines are, for example, those prepared from reacting polytetrahydrofuran (PolyTHF) (TERETHANE 650) with phthalic anhydride and 1,3-phenylene-bis-oxazoline, i.e., (6)

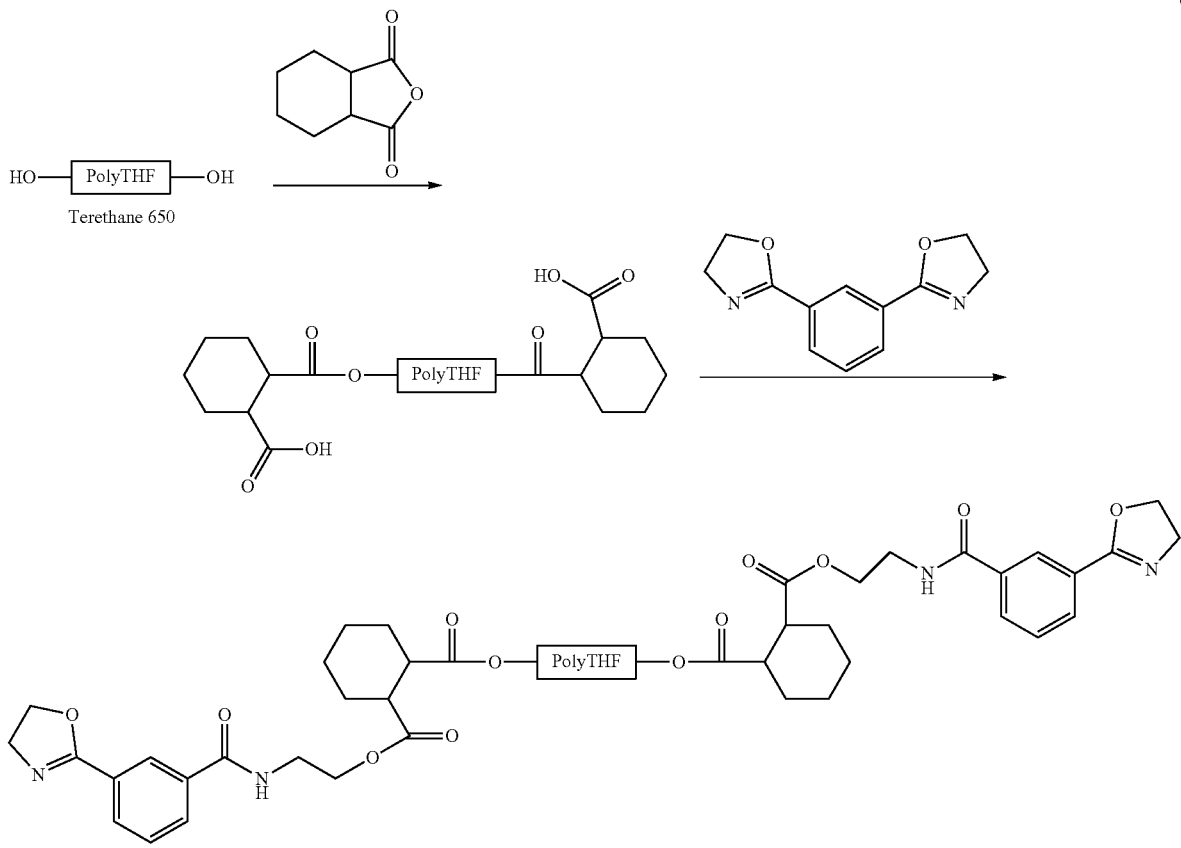

An example of a higher functionality polymeric polyoxazoline could be made using 2,2',2''-hexane-1,3,6-triyl(4,5-dihydrooxazole), i.e.,

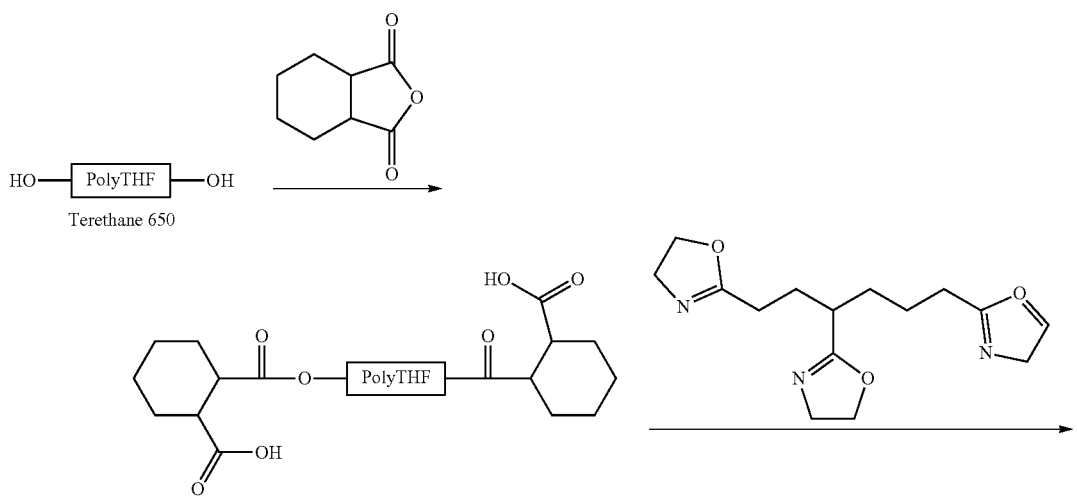

-continued

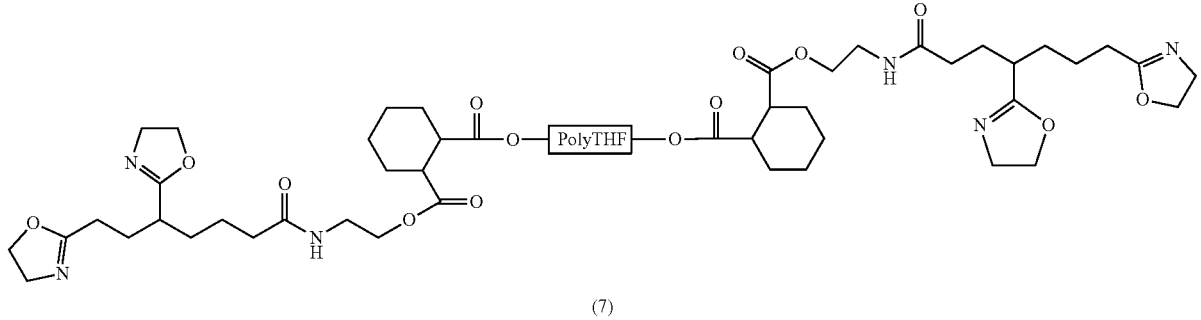

(7)

The polymeric polyoxazolines are useful as curing agents with polymers comprising acid functionality. The curable compositions may be used as coating compositions such as inks, floor finishes, protective and decorative coating compositions for automotive and industrial applications.

Examples of the polymers comprising acid functionality are the carboxylic acid functional polyethers, polyesters and polyurethanes mentioned above. Also, a carboxylic acid functional (meth)acrylic polymer may be used.

The carboxyl-containing (meth)acrylic polymer can be obtained in the conventional manner, specifically by solution or emulsion polymerization.

For example, the carboxyl-containing (meth)acrylic polymer can be obtained from a carboxyl-containing ethylenically unsaturated monomer and another ethylenically unsaturated monomer.

The carboxyl-containing ethylenically unsaturated monomer can include acrylic acid, methacrylic acid, ethacrylic acid, crotonic acid, maleic acid, fumaric acid, itaconic acid, half esters thereof such as maleic acid ethyl ester, fumaric acid ethyl ester and itaconic acid ethyl ester, succinic acid mono (meth)acryloyloxyethyl ester, phthalic acid mono (meth)acryloyloxyethyl ester and the like. The carboxyl-containing ethylenically unsaturated monomer may comprise two or more species.

The other ethylenically unsaturated monomer may include hydroxy-containing ethylenically unsaturated monomers such as 2-hydroxyethyl acrylate, 2-hydroxyethyl methacrylate, 4-hydroxybutyl acrylate, and 4-hydroxybutyl methacrylate. Nonfunctional ethylenically unsaturated monomers such as styrene, alpha-methylstyrene, acrylate esters (e.g. methyl acrylate, ethyl acrylate, butyl acrylate, 2-ethylhexyl acrylate) and methacrylate esters (e.g. methyl methacrylate, ethyl methacrylate, butyl methacrylate, isobutylmethacrylate, tert-butyl methacrylate, 2-ethylhexyl methacrylate, lauryl methacrylate) are typically present. The above other ethylenically unsaturated monomer may comprise two or more species. The carboxyl-containing (meth)acrylic polymers typically may have acid values of at least 2, such as 5 to 100.

The calculated molar ratio of polyoxazoline to carboxylic acid in the composition can be 0.05:1 to 5:1, such as 0.5:1 to 2:1.

The polymeric polyoxazolines and/or the coating compositions of the present invention may be substantially free, may be essentially free and/or may be completely free of bisphenol A and epoxy compounds derived from bisphenol A ("BPA"), such as bisphenol A diglycidyl ether ("BADGE"). Such polymeric polyoxazolines and/or coating compositions are sometimes referred to as "BPA non intent" compositions because BPA, including derivatives or residues thereof, are not intentionally added but may be present in trace amounts because of impurities or unavoidable contamination from the environment. The polymeric polyoxazolines and/or coating compositions can also be substantially free, may be essentially free and/or may be completely free of bisphenol F ("BPF") and epoxy compounds derivatived from bisphenol F, such as bisphenol F diglycidyl ether ("BFDGE"). The term "substantially free" as used in this context means the polymeric polyoxazolines and/or coating compositions contain less than 1000 parts per million (ppm), "essentially free" means less than 100 ppm and "completely free" means less than 20 parts per billion (ppb) of any of the above mentioned compounds, derivatives or residues thereof.

In addition, the polymeric polyoxazolines and/or the coating compositions of the present invention may be substantially free, may be essentially free and/or may be completely free of formaldehyde. The term "substantially free" as used in this context means the polymeric polyoxazolines and/or coating compositions contain, and/or release on cure, less than 1000 parts per million (ppm), "essentially free" means less than 100 ppm and "completely free" means less than 100 parts per billion (ppb) of formaldehyde compounds, derivatives or residues thereof.

Typically, the coating composition will contain a diluent, such as water, or an organic solvent or a mixture of water and organic solvent to dissolve or disperse the resinous binder. The organic solvent may be selected to have sufficient volatility to evaporate essentially entirely from the coating composition during the curing process. Examples of suitable organic solvents are aliphatic hydrocarbons such as mineral spirits and high flash point VM&P naphtha; aromatic hydrocarbons such as benzene, toluene, xylene and solvent naphtha 100, 150, 200 and the like; alcohols, for example, ethanol, n-propanol, isopropanol, n-butanol and the like; ketones such as acetone, cyclohexanone, methylisobutyl ketone and the like; esters such as ethyl acetate, butyl acetate, and the like; glycols such as butyl glycol, glycol ethers such as methoxypropanol and ethylene glycol monomethyl ether and ethylene glycol monobutyl ether and the like. Mixtures of various organic solvents can also be used. For aqueous compositions, the polymer comprising acidic functionality, such as an acid functional (meth)acrylic polymer, the acid groups are at least partially neutralized with an amine to assist in the dispersion or dissolution of the resinous binder in the aqueous medium. When present, the diluent used in the coating compositions can be in amounts of 20 to 80, such as 30 to 70 percent by weight based on total weight of the coating composition.

The present compositions can be applied to any substrates known in the art, for example, automotive substrates, marine substrates, industrial substrates, packaging substrates, lumber, wood flooring and furniture, apparel, electronics including housings and circuit boards and including consumer electronics such as housings for computers, notebooks, smartphones, tablets, televisions, gaming equipment, computer equipment, computer accessories, MP3 players, and the like, glass and transparencies, sports equipment including golf balls, and the like. These substrates can be, for example, metallic or non-metallic. Metallic substrates include tin, steel, tin-plated steel, chromium passivated steel, galvanized steel, aluminum, and aluminum foil. Metal sheet as used herein refers to flat metal sheet and coiled metal sheet, which is coiled, uncoiled for coating and then re-coiled for shipment to a manufacturer. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and the like. The substrate can be one that has been already treated in some manner, such as to impart visual and/or color effect.

The compositions of the present invention can be applied by any means standard in the art, such as electrocoating, spraying, electrostatic spraying, dipping, rolling, brushing, and the like.

The compositions of the present invention can be used alone, or in combination with one or more other compositions, such as a coating system having two or more layers. For example, the compositions of the present invention can comprise a colorant or not and can be used as a primer, basecoat, and/or top coat. For substrates coated with multiple coatings, one or more of those coatings can be coatings as described herein. The present coatings can also be used as a packaging "size" coating, wash coat, spray coat, end coat, and the like.

It will be appreciated that the compositions described herein can be either one component ("1K"), or multi-component compositions such as two component ("2K") or more. A 1K composition will be understood as referring to a composition wherein all the coating components are maintained in the same package after manufacture, during storage, etc. A 1K composition can be applied to a substrate and cured by any conventional means, such as by heating, forced air, and the like. The present compositions can also be multi-component, which will be understood as compositions in which various components are maintained separately until just prior to application.

The composition can be a clearcoat. A clearcoat will be understood as a coating that is substantially transparent or translucent. A clearcoat can therefore have some degree of color, provided it does not make the clearcoat opaque or otherwise affect, to any significant degree, the ability to see the underlying substrate. The clearcoats of the present invention can be used, for example, in conjunction with a pigmented basecoat. The clearcoat can be formulated as is known in the coatings art.

The composition may also comprise a colorant, such as a pigmented basecoat used in conjunction with a clearcoat, or as a pigmented monocoat. Such coating layers are used in various industries to impart a decorative and/or protective finish. For example, such a coating or coating system may be applied to a vehicle. "Vehicle" is used herein in its broadest sense and includes all types of vehicles, such as but not limited to cars, trucks, buses, vans, golf carts, motorcycles, bicycles, railroad cars, boats, ships, airplanes, helicopters and the like. It will be appreciated that the portion of the vehicle that is coated according to the present invention may vary depending on why the coating is being used. For example, anti-chip primers may be applied to some of the portions of the vehicle. When used as a colored basecoat or monocoat, the present coatings will typically be applied to those portions of the vehicle that are visible such as the roof, hood, doors trunk lid and the like of a car, but may also be applied to other areas such as inside the trunk, inside the door and the like especially when the compositions are formulated as sealants or adhesives; for example, the compositions can be formulated so as to have a viscosity such that they provide sound and/or vibration damping to a vehicle. The present compositions can also be applied to those portions of the vehicle that are in contact with the driver and/or passengers, such as the steering wheel, dashboard, gear shift, controls, door handle and the like. Clearcoats will typically be applied to the exterior of a vehicle.

The present invention is further directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage package or bakeware in which a consumer might make and/or store food; such a package would only maintain the freshness or integrity of the food item for a relatively short period. "Package" as used herein means the complete package itself or any component thereof, such as an end, lid, cap, and the like. For example, a "package" coated with any of the coating compositions described herein might include a metal can in which only the can end or a portion thereof is coated. A package according to the present invention can be made of metal or non-metal, for example, plastic or laminate, and be in any form. An example of a suitable package is a laminate tube. Another example of a suitable package is metal can. The term "metal can" includes any type of metal can, package or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, packages or any type of receptacle or portion thereof used to hold any type of food and/or beverage. "Beverage can" may also be used to refer more specifically to a food can in which a beverage is packaged. The term "metal can(s)" specifically includes food cans, including beverage cans, and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. The coating is applied to a coil or sheet by roll coating; the coating is then cured by radiation and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can be applied to the "side stripe" of a metal can, which will be understood as the seam formed during fabrication of a three-piece can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans. The coating can be applied to can stock before formation of the can or can part, or can be applied to the can or can part after formation.

Any material used for the formation of food cans can be treated according to the present methods. Particularly suitable substrates include tin-plated steel, tin-free steel and black-plated steel.

The present invention is therefore further directed to a method of coating a package comprising applying at least a portion of the package any of the coating compositions described above, and curing the coating. Two-piece cans are manufactured by joining a can body (typically a drawn metal body) with a can end (typically a drawn metal end). The coatings of the present invention are suitable for use in food contact situations and may be used on the inside of such cans. They are particularly suitable for spray applied, liquid coatings for the interior of two-piece drawn and ironed beverage cans and coil coatings for food can ends. The present invention also offers utility in other applications. These additional applications include, but are not limited to, wash coating, sheet coating, and side seam coatings (e.g., food can side seam coatings).

Spray coating includes the introduction of the coating composition into the inside of a preformed package. Typical preformed packages suitable for spray coating include food cans, beer and beverage packages, and the like. The spray may utilize a spray nozzle capable of uniformly coating the inside of the preformed package. The sprayed preformed package is then subjected to heat to remove the residual solvents and harden the coating. For food inside spray, the curing conditions involve maintaining the temperature measured at the can dome at 350 to 500° F. for 0.5 to 30 minutes.

A coil coating is described as the coating of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as 2-piece drawn food cans, 3-piece food cans, food can ends, drawn and ironed cans and the like.

A wash coating is commercially described as the coating of the exterior of two-piece drawn and ironed ("D&I") cans with a thin layer of protectant coating. The exterior of these D&I cans are "wash-coated" by passing pre-formed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife." Once the desired amount of coating is applied to the exterior of each can, each can is passed through a thermal, ultraviolet, and/or electromagnetic curing oven to harden (e.g., dry and cure) the coating.

A sheet coating is described as the coating of separate pieces of a variety of materials (e.g., steel or aluminum) that have been pre-cut into square or rectangular "sheets." Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as 2-piece drawn food cans, 3-piece food cans, food can ends, drawn and ironed cans and the like.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically require a layer of liquid coating, which protects the exposed "weld" from subsequent corrosion or other effects to the contained foodstuff. The liquid coatings that function in this role are termed "side seam stripes". Typical side seam stripes are spray applied and cured quickly via residual heat from the welding operation in addition to a small thermal, ultraviolet, and/or electromagnetic oven.

ASPECTS OF THE INVENTION

Non-limiting aspects of the present invention include:
1. A polymeric polyoxazoline having the structure:

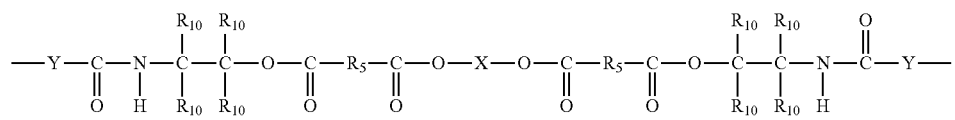

where X is the residue of a polymeric polyol after reaction with a dicarboxylic acid/anhydride; where $R_5$ is an organic moiety; where Y is an organic moiety containing one or more oxazoline groups; and wherein each $R_{10}$ is independently hydrogen or an organic moiety.

2. The polymeric polyoxazoline of aspect 1, in which X is the residue of a polyester polyol, a polyether polyol or a polyurethane polyol polymer.
3. The polymeric polyoxazoline of any preceding aspect in which Y independently contains one or two oxazoline groups.
4. The polymeric polyoxazoline of any preceding aspect in which $R_5$ comprises ethylene ($C_2H_4$) or cyclohexane ($C_6H_{10}$).
5. The polymeric polyoxazoline of any preceding aspect in which $R_{10}$ comprises hydrogen.
6. A method for making a polymeric polyoxazoline comprising:
   (a) reacting a polymeric polyol having terminal and/or pendant hydroxyl groups with a dicarboxylic acid/anhydride to form a carboxylic acid functional polymer, and
   (b) reacting the carboxylic functional polymer with a polyoxazoline containing at least two oxazoline groups.
7. The method of aspect 6 in which the polymeric polyol comprises a polyester polyol, a polyether polyol, a polyurethane polyol, or mixtures thereof.
8. The method of aspect 6 or aspect 7 in which the dicarboxylic acid/anhydride contains 2 to 30 carbon atoms.
9. The method of any preceding aspect in which the dicarboxylic acid/anhydride comprises phthalic anhydride.
10. The method of any of aspects 6 to 9 in which the polymeric polyol comprises a polyether polyol.
11. The method of any of aspects 6 to 10 in which the polyoxazoline comprises a phenylene-bis-oxazoline.
12. The method of aspect 11 in which the phenylene-bis-oxazoline comprises 1,3-phenylene-bis-oxazoline.
13. The method of any one of aspects 6 to 10 in which the polyoxazoline comprises 2,2',2"-(hexane-1,3,6-triyl) tris(4,5-dihydrooxazole).
14. A coating composition comprising:
   (a) a polymer comprising acidic functionality, and
   (b) a polymeric polyoxazoline crosslinking agent having the following structure:

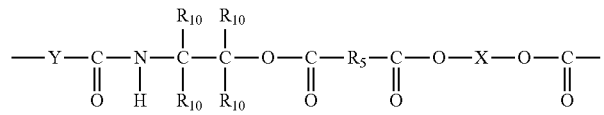 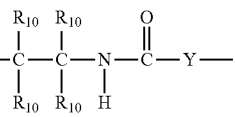

where X is the residue of a polymeric polyol after reaction with a dicarboxylic acid/anhydride; where $R_5$ is an organic moiety; where Y is an organic moiety containing one or more oxazoline groups; and wherein each $R_{10}$ is independently hydrogen or an organic moiety.
15. The coating composition of aspect 14 in which the polymer comprising acidic functionality comprises a polyester polymer and/or a (meth)acrylic polymer.
16. The coating composition of aspect 14 or aspect 15 in which (a) and (b) are dispersed in aqueous medium.
17. The coating composition of any of aspects 14 to 16 in which the molar ratio of polyoxazoline to carboxylic acid is 0.05:1 to 2:1.
18. The coating composition of any of aspects 14 to 17, wherein the polymeric polyoxazine crosslinking agent comprises a polymeric polyoxazine that has the structural unit according to any one of aspects 1 to 5 and/or is made by a method according to any one of aspects 6 to 13.
19. A package coated at least in part on a surface thereof, the coating composition comprising any of the coating compositions of aspects 14 to 18.
20. The coated package of aspect 19 in which the package is a metal can.
21. The coated package of aspect 19 or aspect 20 in which the coating is applied to at least a portion of a food-contacting surface of the package.
22. The coated package of any one of aspects 19 to 21 in which the coating composition is applied to the surface of a can end.
23. The coated package of any one of aspects 19 to 22 in which the composition is an aqueous-based composition in which (a) and (b) are dispersed in aqueous medium.
24. The coated package of any one of aspects 19 to 23 in which the polymer comprising acidic functionality comprises a carboxyl group-containing (meth)acrylic polymer, a carboxyl group-containing polyester polymer, or mixtures thereof.
25. The coated package of any one of aspects 19 to 24 in which the coating composition is a coating composition according to any one of claims 14 to 18.
26. The coating composition of any of aspects 14 to 18 wherein the coating composition is substantially free, essentially free and/or completely free of BPA, BADGE, BPF, BFDGE and/or formaldehyde.
27. A method of coating a package comprising applying to at least a portion of the package with any of the coating compositions of aspects 14 to 18.

EXAMPLES

The following examples are offered to aid in understanding of the present invention and are not to be construed as limiting the scope thereof. Unless otherwise indicated, all parts and percentages are by weight.

Example 1: Synthesis of 2,2',2"-(hexane-1,3,6-triyl) tris(4,5-dihydrooxazole)

To a 1000 mL four-neck reaction flask was added the following: 161.2 g of hexane-1,3,6-tricarbonitrile, 4.8 g zinc octoate and 150.7 g xylene. The flask was then fitted with a thermocouple, water condenser, stirring blade, and 0.5 SCFH nitrogen blanket. While under agitation the contents of the flask were heated to 130° C. At 127° C., 244.6 g of monoethanolamine was added into the flask dropwise. After addition, the reaction mixture was held at reflux for 10 hours until IR spectroscopy showed the absence of the characteristic nitrile band (2244 cm$^{-1}$) using a ThermoScientific Nicolet iS5 FT-IR. Excess ethanolamine was removed using Dean Stark by azeotropic distillation. After removing of ethanolamine, xylene was distilled off. The reaction mixture was cooled to 60° C. and poured out.

Example 2

A polymeric polyoxazoline as shown in structure (7) above was prepared as follows:
To a 500 mL four-neck reaction flask was added the following: 79.6 g of TERETHANE 650 and 37.7 g hexahydrophthalic anhydride. The flask was then fitted with a thermocouple, water condenser, stirring blade, and 0.2 SCFH nitrogen blanket. While under agitation the contents of the flask were heated to 150° C. and held for 1 hour. After holding, the reaction mixture was cooled to 120° C. At 120°

C., 71.9 g of the polyoxazoline from Example 1 was added into the reaction mixture. The reaction mixture was held at 150° C. for 2 hours then heated to 200° C. for 3 hours until an acid value of less than 2 was obtained with a Metrohm 888 Titrando using a 0.1 N KOH solution in methanol as the reagent. Then the reaction mixture was cooled to 60° C. and 100 g 1-methoxy-2-propanol was added into the reaction mixture. The final product was poured out through a filter bag.

Example 3

A polymeric polyoxazoline as shown in structure (6) above was prepared as follows:

To a 500 mL four-neck reaction flask was added the following: 79.6 g of TERETHANE 650 and 37.7 g hexa-hydrophthalic anhydride. The flask was then fitted with a thermocouple, water condenser, stirring blade, and 0.2 SCFH nitrogen blanket. While under agitation the contents of the flask were heated to 150° C. and held for 1 hour. After holding, 66.2 g 1,3-phenylene-bis-oxazoline was added into the reaction mixture. The reaction mixture was held at 150° C. for 5 hours until an acid value of less than 2 was obtained with a Metrohm 888 Titrando using a 0.1 N KOH solution in methanol as the reagent. Then the reaction mixture was cooled to 60° C. and poured out.

Example 4

An aqueous-based coating composition containing polymer comprising acidic functionality component and the polymeric polyoxazoline polymer of Example 2 was prepared from the following mixture of ingredients:

| Material | Grams of Material |
|---|---|
| Acrylic Latex[1] | 78.05 |
| Solution Acrylic[2] | 5.61 |
| Polymeric Polyoxazoline of Example 2 | 2.54 |
| Phosphoric Acid-DMEA Solution[3] | 0.69 |
| Butanol | 6.87 |
| Pentanol | 2.75 |
| 2-Butoxyethanol | 2.75 |
| Dimethyl Ethanolamine | 0.74 |
| TOTAL | 100.00 |
| #4 FORD CUP VISCOSITY at 21° C. (seconds) | 19.3 |
| pH | 7.8 |
| Paint Theory Weight Solids | 27.5 |

[1]Acrylic Latex with a composition of 5% acrylic acid, 40% BMA, 30% BA and 25% MMA made using 0.44% ammonium persulfate initiator on monomer solids to 29.5% solids in deionized water with a MALVERN Z-Average particle size of 355 nm. The latex was 25% neutralized with dimethyl ethanolamine and contains 0.12% sodium bicarbonate on monomer solids.
[2]Acrylic solution polymer with a composition of 21% acrylic acid, 35% butyl acrylate and 44% butyl methacrylate made in a solvent blend of 40% butanol, 50% 2-butoxyethanol and 10% deionized water to 49% weight solids having GPC number average molecular weight of 4,115 and a weight average molecular weight of 12,047. The solution polymer was made using a total of 1.25% t-butyl peroxy-3,5,5-trimethylhexanoate on monomer solids as the initiator. The solution polymer was 50% neutralized using dimethyl ethanolamine.
[3]Phosphoric acid neutralized with dimethyl ethanolamine in deionized water made using 2.35 grams of phosphoric acid (85%), 3.2 grams of dimethyl ethanolamine and 14.45 grams of deionized water.

The coating was drawn down on flat aluminum beverage cans using a #9 bar in order to achieve a target film weight in the 5 to 6 g/m² range. The coatings were baked in a box oven set at 215° C. for one minute and forty five seconds. The film weights were measured using a Strand Gauge. The MEK resistance was determined using the 2 Lb. Hammer procedure using gauze and a double rub procedure. One set of panels was exposed to boiling 3% acetic acid for 30 minutes followed by a ten-day soak in 3% acetic acid at 40° C. The panels were tested for coating adhesion to the aluminum substrate using BYK Cross-Cut Tester Kit #5127 with 1.5 mm blade. The paints were also drawn down on tinplate substrate for Wedge Bend Flexibility testing that uses the BYK Gardner Impact Tester. The impact tester applies a 48 inch-lbs. impact force to the coated and folded aluminum panel. The panels were rusted using copper sulfate solution. The length of no rusting is recorded in the table below. More flexible films have a larger number.

| | | Wedge Bend | 3% Acetic Acid 100° C./30 minutes + 10 Days at 40° C. | |
|---|---|---|---|---|
| Cured Coating | Film Weight g/m² | Flexibility No Rusting in mm Continuous | Adhesion Loss 0 = None 5 = Total | Comments |
| Example 4 | 6.2 | 100 | 1 | Slight Blush |
| Control[1] | 5.4 | 80 | 0 | OK |

[1]The Control is a commercially available coating for the inside of beverage cans. The coating is a bisphenol A-containing Epoxy-Acrylic based paint.

Whereas particular embodiments of this invention have been described above for purposes of illustration, it will be evident to those skilled in the art that numerous variations of the details of the present invention may be made without departing from the invention as defined in the appended claims.

What is claimed is:

1. A vehicle comprising a coating composition applied to at least a portion of a surface of the vehicle, the coating composition comprising:
   (a) a polymer comprising carboxylic acidic functionality; and
   (b) a polymeric polyoxazoline crosslinking agent having the following structure:

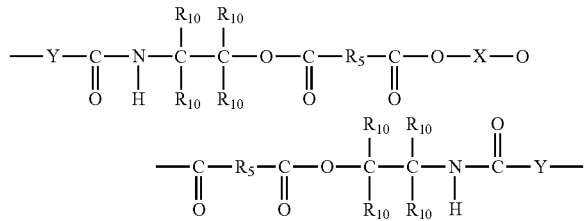

where X is the residue of a polymeric polyol after reaction with a dicarboxylic acid/anhydride;
   where $R_5$ is an organic moiety; where Y is an organic moiety containing one or more oxazoline groups; and wherein each $R_{10}$ is independently hydrogen or an organic moiety.

2. The vehicle of claim 1, wherein the polymer comprising acidic functionality comprises a polyester polymer and/or a (meth)acrylic polymer.

3. The vehicle of claim 1, wherein the coating composition is an aqueous-based composition and (a) and (b) are dispersed in aqueous medium.

4. The vehicle of claim 1, wherein the molar ratio of polyoxazoline to carboxylic acid in the coating composition is 0.05:1 to 2:1.

5. The vehicle of claim 1, wherein the coating composition further comprises a colorant.

6. The vehicle of claim 1, wherein the coating composition is substantially free of formaldehyde.

7. The vehicle of claim 1, wherein the coating composition is substantially free of BPA.

8. The vehicle of claim 1, wherein the coating composition is a clearcoat, a pigmented basecoat, or a pigmented monocoat.

9. A method of coating a vehicle, the method comprising applying to at least a portion of a surface of the vehicle a coating composition comprising
   (a) a polymer comprising carboxylic acidic functionality; and
   (b) a polymeric polyoxazoline crosslinking agent having the following structure:

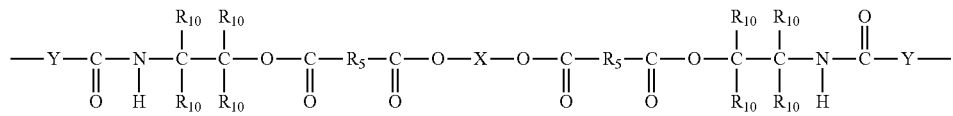

where X is the residue of a polymeric polyol after reaction with a dicarboxylic acid/anhydride;
   where $R_5$ is an organic moiety; where Y is an organic moiety containing one or more oxazoline groups; and wherein each $R_{10}$ is independently hydrogen or an organic moiety.

10. The method of claim 9, wherein the coating composition is applied by electrocoating, spraying, electrostatic spraying, dipping, rolling, and/or brushing.

11. The method of claim 9, wherein the polymer comprising acidic functionality comprises a polyester polymer and/or a (meth)acrylic polymer.

12. The method of claim 9, wherein the coating composition is an aqueous-based composition and (a) and (b) are dispersed in aqueous medium.

13. The method of claim 9, wherein the molar ratio of polyoxazoline to carboxylic acid in the coating composition is 0.05:1 to 2:1.

14. The method of claim 9, wherein the coating composition further comprises a colorant.

15. The method of claim 9, wherein the coating composition is substantially free of formaldehyde.

16. The method of claim 9, wherein the coating composition is substantially free of BPA.

17. The method of claim 9, wherein the coating composition is applied as a clearcoat, a pigmented basecoat, or a pigmented monocoat.

* * * * *